United States Patent
Kronz

(10) Patent No.: US 7,072,313 B2
(45) Date of Patent: Jul. 4, 2006

(54) FLEX SLOTTED ALOHA TRANSMISSION SYSTEM AND METHOD

(75) Inventor: Ronald Loye Kronz, Fairfax, VA (US)

(73) Assignee: Gilat Satellite Networks, Inc, Mclean, VA (US)

( * ) Notice: Subject to any disclaimer, the term of this patent is extended or adjusted under 35 U.S.C. 154(b) by 816 days.

(21) Appl. No.: 10/193,235

(22) Filed: Jul. 12, 2002

(65) Prior Publication Data

US 2003/0086373 A1 May 8, 2003

Related U.S. Application Data

(62) Division of application No. 09/088,897, filed on Jun. 2, 1998, now Pat. No. 6,577,610.

(60) Provisional application No. 60/051,205, filed on Jun. 30, 1997.

(51) Int. Cl.
*H04B 7/212* (2006.01)
*H04J 1/16* (2006.01)

(52) U.S. Cl. .................. 370/322; 370/235; 370/252; 370/328; 370/348; 370/358; 370/468

(58) Field of Classification Search ............... 370/232, 370/229, 235, 252, 294, 321–322, 328, 337, 370/345–349, 358, 368, 390, 407, 422, 431, 370/437, 442, 458–461, 468, 474, 477, 498, 370/508

See application file for complete search history.

(56) References Cited

U.S. PATENT DOCUMENTS 5,003,534 A 3/1991 Gerhardt et al.
5,065,398 A 11/1991 Takashima
5,818,823 A 10/1998 Nakanishi

OTHER PUBLICATIONS

"Multichannel Reservation Protocols for Satellite Multiple Access Networks", Victor Leung, Proceedings of the Pacific Rim Conference on Mommunications, computer and Signal Processing, Victoria, CA, May 9-10, 1991, vol. 2, pp. 414-417, XP000280332.
"Selective Reject ALOHA/FCFS with Implicit Reservation", D. Raychaudhuri et al., IEEE International Conference on Communications, World Prosperity Through Communications, Boston, Jun. 11-14, 1989, vol. 1, pp. 487-493, XP000075496.

*Primary Examiner*—William A. Luther
(74) *Attorney, Agent, or Firm*—Banner & Witcoff

(57) ABSTRACT

A flexible slotted Aloha communication protocol for a burst-type communication network divides a communication channel into a series of time cycles, with each time cycle further divided into contiguous time slices of identical duration. All data transmissions in the network begin at the start of a time slice and continue for an integer number of time slices, with the identity of the transmitting terminal, the length of the transmission and error correction, being included within the first time slice of each data transmission. Communication terminals in the network transmit reservation requests to a network hub which receives the reservation requests and reserves reserved time slots each having a number of time slices which matches the length of the data transmission to be transmitted in the reserved time slot. The reserved time slot may include time slices in more than one time cycle. The communication protocol dynamically adjusts reservation parameters to match traffic load conditions on the channel and may reassign communication terminals from one channel to another in order to dynamically balance the load on the channels.

6 Claims, 4 Drawing Sheets

| Congestion Level | Randomization Interval (slices) | Maximum Random Aloha Transmission Length (slices) |
|---|---|---|
| 0 | 8 | 24 |
| 1 | 12 | 16 |
| 2 | 16 | 12 |
| 3 | 20 | 9 |
| 4 | 24 | 6 |
| 5 | 32 | 4 |
| 6 | 48 | 3 |
| 7 | 64 | 2 |

| Congestion Level | Randomization Interval (slices) | Maximum Random Aloha Transmission Length (slices) |
|---|---|---|
| 0 | 8 | 24 |
| 1 | 12 | 16 |
| 2 | 16 | 12 |
| 3 | 20 | 9 |
| 4 | 24 | 6 |
| 5 | 32 | 4 |
| 6 | 48 | 3 |
| 7 | 64 | 2 |

*Fig. 4*

FLEX SLOTTED ALOHA TRANSMISSION SYSTEM AND METHOD

This application claims the benefit of priority of U.S. Provisional Application No. 60/051,205, filed Jun. 30, 1997 and U.S. application Ser. No. 09/088,897 filed Jun. 2, 1998 now U.S. Pat. No. 6,577,610.

BACKGROUND OF THE INVENTION

1. Field of the Invention

This invention pertains to the field of communication networks and, more particularly, to a system and method of communication in a burst-type communication network.

2. Background of the Related Art

In a burst-type communication network, it is inefficient to dedicate communication channels to individual communication terminals which may only transmit sporadically. Consequently, in many burst-type communication networks, communication terminals share communication resources.

Typically, a burst-type communication terminal transmits data as a series of data packets, containing a packet header and a data payload. The packet header is often used by a receiving terminal to detect and synchronize the receiver to the data transmission. The header also may contain information regarding the data transmission, such as packet length, data format, transmitter ID, receiver ID, etc.

Burst-type communication networks employ a variety of protocols for sharing limited communication resources among multiple communication terminals. One well-known protocol used in communication networks which transmit packetized data is the Aloha (also called "pure Aloha") communication protocol.

In a network using the pure Aloha protocol, any communication terminal in the network may initiate a data transmission at any random time within a time frame. Because of the random times at which a terminal may initiate a data transmission, two or more terminals may initiate a data transmission at overlapping times, resulting in a "collision."

Transmissions involved in such collisions arrive at a receiver with errors. After a suitable delay without receiving acknowledgments confirming successful reception, the transmitters retry the transmissions. Of course these transmissions may also encounter collisions and therefore may also be unsuccessful. The terminals continue transmitting with suitable delay between transmissions, until the transmissions are received without error and acknowledged. Collisions reduce the throughput efficiency of the network. Maximum throughput efficiency in a pure Aloha network is 18.4%.

One important variation of the Aloha protocol is called "slotted Aloha". FIG. 1 illustrates principles of a slotted Aloha communication protocol. As shown in FIG. 1, a communication network using a slotted Aloha communication protocol divides time into a series of time slots 124, which are usually organized into a repetitive series of longer time periods called "time frames". All data transmissions from any communication terminal in the communication network must begin and end within a time slot. If a communication terminal has a data transmission which is longer than a time slot period, then it must break the data transmission up into two or more shorter data transmissions which each fit within a time slot period.

Nevertheless, in a slotted Aloha network, any communication terminal may transmit in any slot and so collisions still occur. Maximum throughput efficiency in a slotted Aloha network is 36.8%.

To reduce collisions, some communication networks employ a slotted Aloha protocol which includes a reservation feature, assigning a portion of the time slots in each time frame as reserved for exclusive use by designated terminals. In a reservation protocol, a communication terminal having a message to transmit may first transmit a special message called a reservation request. A network hub or controller monitors the reservation request and assigns one or more reserved time slots to the requesting terminal during the following time frame or frames. The hub broadcasts the reservation to the communication network so that all other terminals in the network avoid transmitting during the reserved time slot(s).

FIG. 1 shows reserved time slots 130 in each time frame 110. The use of reservations with a slotted Aloha protocol increases overall throughput efficiency for the network.

In general, reservation protocols may use two types of reserved capacity:

temporary and indefinite. Temporary reserved capacity allocates reserved time slots on a time-slot-by-time-slot basis within a frame. Indefinite reserved capacity is allocated as reserved time slots which are set aside for use by designated transmitters for an indefinite number of consecutive time frames.

Typically, a communication network may transmit data packets with a wide variety of packet lengths. High network throughput efficiency requires the use of time slots with lengths which are well matched to the data packets to be transmitted. If a data transmission is shorter than a time slot, part of the slot period will be wasted, reducing efficiency. If a data transmission is too long for a time slot, the data transmission will have to be broken into multiple time slots. In that case, some of the packet header information and other overhead for the data transmission is repeated in each time slot, again reducing efficiency.

To improve efficiency in a slotted Aloha network, all time slots may not have equal length. Short data packets can be transmitted in short time slots and long data packets can be transmitted in long time slots. FIG. 1 shows time frames in a slotted Aloha network with reservations where the reserved time slots have unequal lengths.

However, the problem remains to match the mix of time slots of different lengths to the mix of packets being transmitted. Also, for many communication networks, the mix of data transmission lengths varies with time, e.g., packets transmitted during the day may have different lengths than those transmitted at night.

Accordingly, it would be advantageous to provide a communication method and network which operates with various changing mixtures of packet lengths with greater throughput efficiency than conventional slotted Aloha networks. It would also be advantageous to provide a communication method and network which automatically adjusts the allocation of reserved time slots when traffic loads are high to increase efficiency. Other and further objects and advantages will appear hereinafter.

SUMMARY OF THE INVENTION

The present invention comprises a flexible slotted Aloha communication method and associated network.

In one aspect of the invention, a communication channel in a burst-type communication network is divided into contiguous time slices of identical duration. All data transmissions in the network begin at the start of a time slice and continue for an integer number of time slices.

In another aspect of the invention, the first time slice of each data transmission contains all of the conventional overhead information for the transmission. The overhead includes header fields, such as a data transmission type, the source and destination of the packet, length of the data transmission, or similar information. The first slice also contains an error check code for the data transmission. Consequently the first slice may be received successfully, even if the rest of a transmission is not successful (e.g., due to collisions or transmission errors). In that event, the overhead transmitted in the first slice is sufficient for the network hub to reserve a reserved time slot which matches the length of the transmission.

In yet another aspect of the present invention, a network hub receives a reservation request for a data transmission and reserves a reserved time slot comprising a number of time slices which matches the length of the data transmission. The reserved time slot may include time slices in more than one time cycle or time frame. A data transmission in a reserved time slot in the network starts at the beginning of a time slice and continues for an integer number of time slices until the data transmission is complete or until the last slice of the reserved time slot.

In a still further aspect of the present invention, a communication network employs a communication protocol which dynamically adjusts reservation parameters to match traffic load conditions. During high traffic load conditions, the maximum allowable random Aloha data transmission length is automatically reduced and the randomization interval for backing off a random data transmission is lengthened.

In yet a still further aspect of the present invention, a communication network operates with a plurality of Flex Slotted Aloha channels. The communication network includes automatic dynamic load balancing which moves communication terminals with outstanding reservation requests from a first channel to a second channel when reservations queue beyond a delay limit for the first channel and the queue is less than the delay limit for the second channel.

BRIEF DESCRIPTION OF THE DRAWINGS

FIG. 4 is a preferred embodiment of an exemplary Flex Slotted Aloha Congestion table according to one or more aspects of the present invention.

DESCRIPTION OF THE PREFERRED EMBODIMENTS

Figure 1:
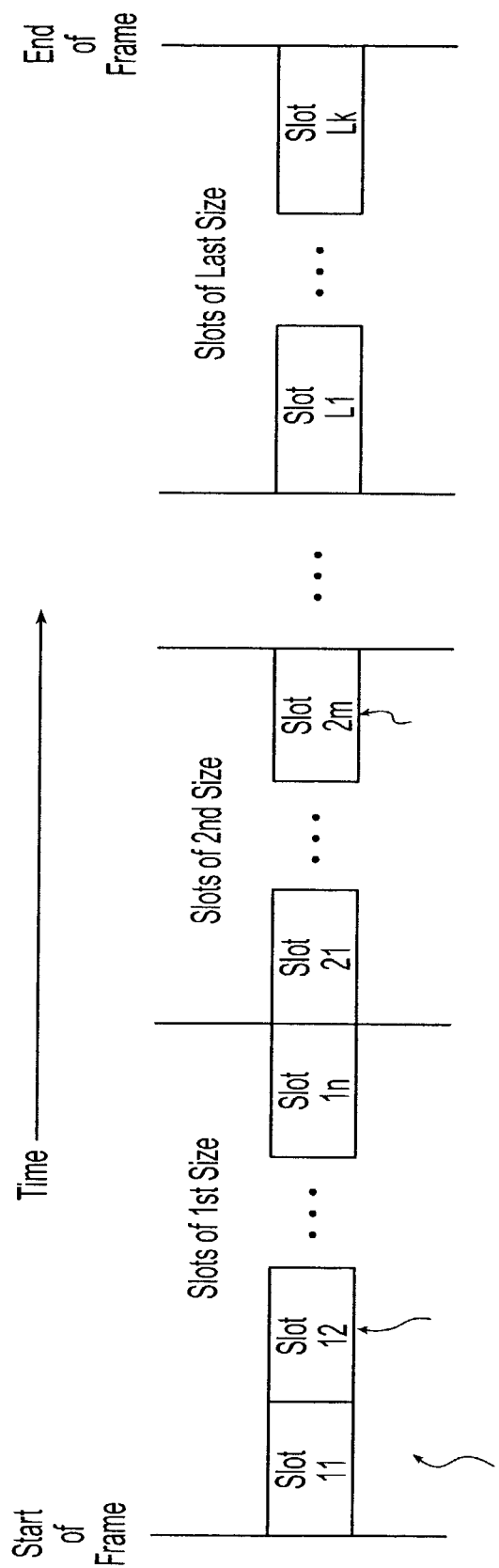
FIG. 1 is a diagram of a time frame structure in a prior art slotted Aloha communication protocol.
Figure 2:
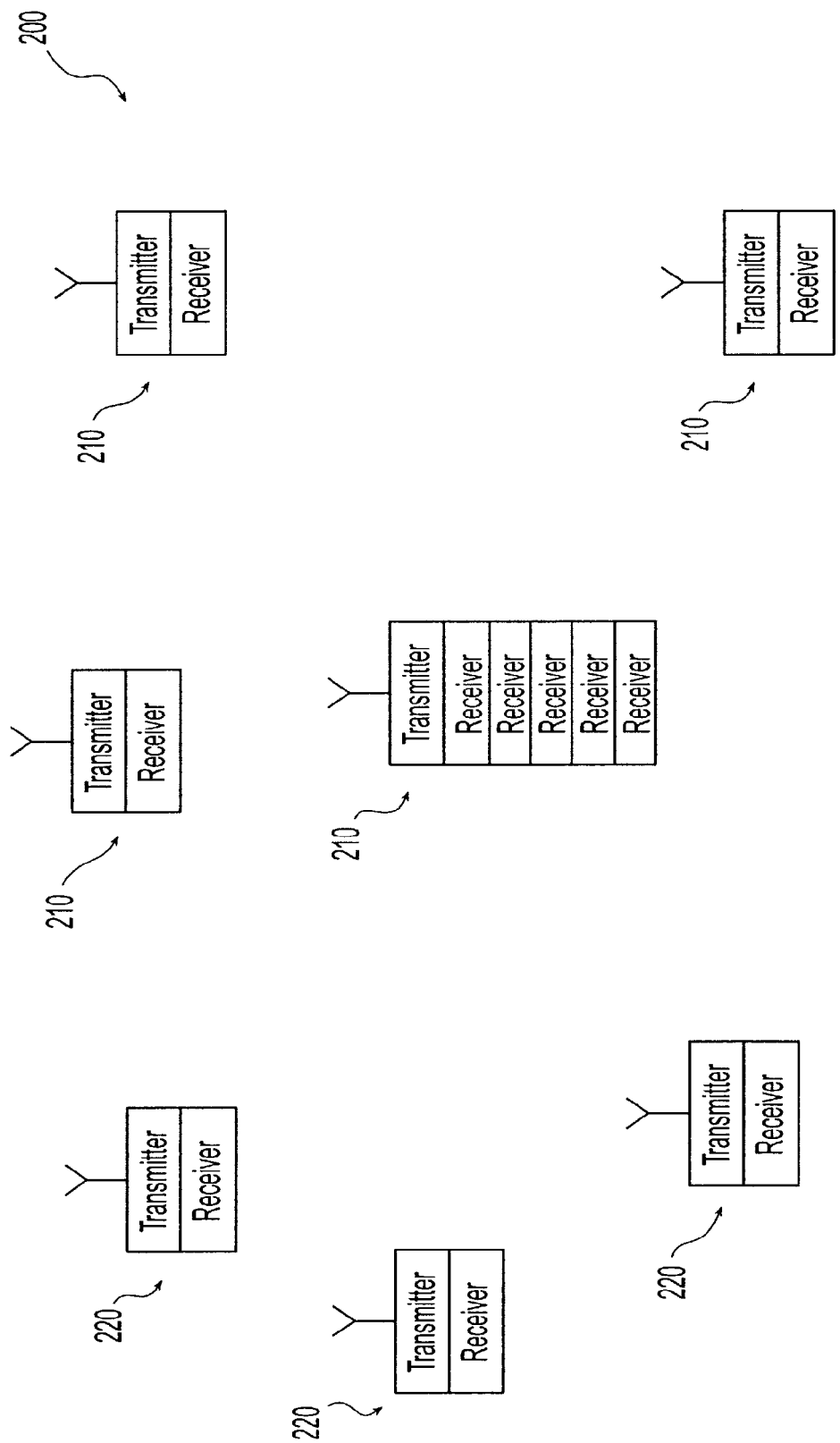
FIG. 2 is a diagram of a point-to-multipoint communication network which may incorporate one or more aspects of the present invention.

FIG. 2 shows a point-to-multipoint communication network 200 which may incorporate one or more aspects of the present invention. The communication network 200 includes a network hub 210 and a plurality of communication terminals 220. The communication terminals 220 share one or more communication channels for transmitting data to the network hub 210. The network hub 210 broadcasts data on one or more broadcast communication channels which may be received by all of the communication terminals 220.

The point-to-multipoint communication network 200 may be a satellite network wherein each communication terminal 220 is a very small aperture antenna terminal (VSAT). A VSAT may transmit data to another VSAT in the network by first transmitting the data to the network hub on a shared communication channel. The network hub then transmits the data on a broadcast channel with appropriate header information indicating the desired destination VSAT.

According to the present invention, a burst-type communication network, which may be a point-to-multipoint communication network, employs a Flex Slotted Aloha communication protocol which divides a communication channel into a series of time cycles.

Figure 3:
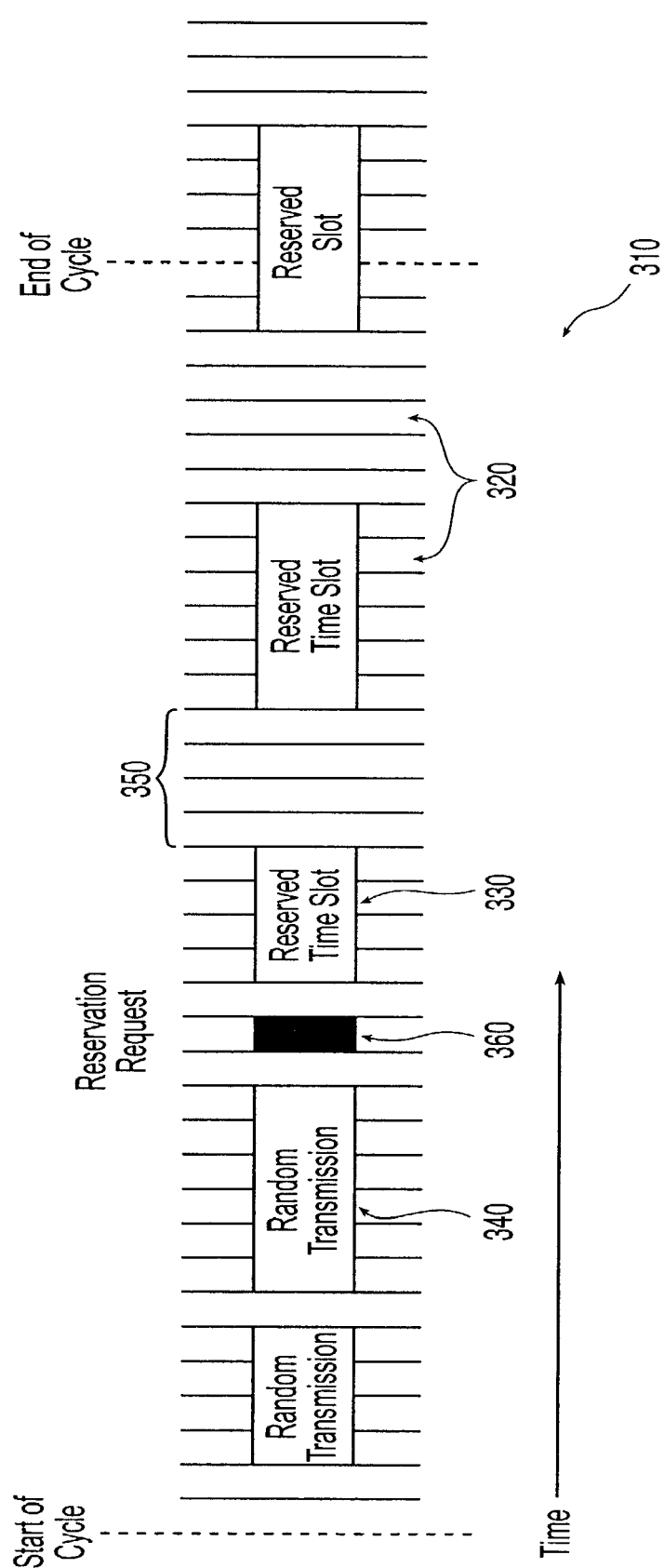
FIG. 3 is a diagram of a time cycle structure in a Flex Slotted Aloha communication protocol according to one or more aspects of the present invention.

FIG. 3 shows a series of time cycles 310 according to a preferred embodiment of a Flex Slotted Aloha protocol. Each time cycle 310 is further divided into series of equal-length time slices 320. The time cycles 310 also include reserved time slots 330 and random data transmissions 340, each of which comprise an integer number of time slices.

According to the present invention, time slice gaps 350, having a minimum number of unreserved time slices 320, are left between consecutive reserved time slots 330. These unreserved time slices are then available for random Aloha access by any communication terminal with data to transmit in Aloha mode. In a preferred embodiment, the minimum size of a time slice gap 350 is configurable. In a preferred embodiment, the minimum number of time slices 320 between consecutive reserved. time slots 330 is in the range of one to four.

When a communication terminal desires to transmit a random data transmission 340 in random Aloha mode, it selects a random starting time slice 320 in a time slice gap 350 between reserved time slots 330. Each communication terminal selects a starting time slice based on a running count of unreserved time slices in the time slice gaps 350 between reserved time slots 330. In a preferred embodiment, a communication terminal selects a starting time slice for random Aloha transmission randomly from a uniform distribution ranging from 1 to a configurable randomization interval. The randomization interval is configured based upon current load and congestion levels in the network as will be explained more fully below.

Next, the communication terminal wishing to transmit in random Aloha mode checks to see whether the entire data transmission can be transmitted in the time slice gap 350 before the next reserved time slot 330. If so, then the communication terminal transmits a random data transmission 340. The first slice of each random data transmission 340 includes overhead for the transmission. Transmission overhead may include, for example, the length of transmission, transmission source ID, transmission destination ID, packet sequence number and information regarding the transmission format itself. The first slice of each random data transmission 340 also includes error correction coding information, such as a cyclic redundancy code (CRC).

If the data transmission is too long to fit into the available time slice gap 350, then the communication terminal transmits only a reservation request 360 (also termed an "explicit" reservation request) in random Aloha mode. The reservation request 360 includes transmission overhead as described above, including the data transmission length. In a preferred embodiment, the reservation request 360 occupies one time slice 320.

If a random data transmission or a reservation request-is not successful (for example due to a collision with another random transmission from another communication terminal), then the transmitting communication terminal waits a configurable predetermined delay, or backoff, including a random number of slices 320, and transmits a reservation request. This reduces the number of random Aloha collisions and thus reduces the general traffic load on the channel.

If a random data transmission 340 does not experience a collision with another random data transmission from another communication terminal in the network, and does not experience any other errors, then it may be received by the hub and sent to the destination communication terminal. However, if the first slice of the random data transmission is received successfully (e.g., it passes the CRC check), but the rest of the random data transmission has errors, then the hub treats the random data transmission as a reservation request (also termed an "implicit" reservation request) for a reserved time slot 330.

When the hub receives an explicit or implicit reservation request, it generates a reserved time slot 330 of the right size to accommodate the desired data transmission, based upon the data transmission length contained in the reservation request. As shown in FIG. 3, a reserved time slot 330 may begin in a first time cycle 310 and end in a second time cycle 310. The hub queues all reservation requests and assigns reserved time slots 330 to the corresponding requesting communication terminal via broadcast messages. The requesting communication message in this way may perform its transmission without collision in a reserved time slot matched to the size of the transmission.

Nevertheless, transmissions in reserved time slots may still occasionally be received with errors due to channel noise. However, if the first slice of the data transmission in a reserved time slot is received successfully (e.g., it passes the CRC check), but the rest of the transmission has errors, then the hub treats the data transmission as an implicit reservation request for a reserved time slot 330.

In a preferred embodiment, the hub also tracks the congestion level on the channel and broadcasts this congestion level to the communication terminals in the communication network.

In a preferred embodiment, the hub maintains a smoothed running exponential estimate of the number of random Aloha data transmission attempts per successful random Aloha data transmission. In this way, the hub produces an estimate of the retransmission rate in the network. In a preferred embodiment, the hub converts the retransmission rate estimate into a congestion level value.

An exemplary preferred embodiment of a table for mapping an estimated retransmission rate to a congestion level value is shown in Table 1 below

TABLE I

| Congestion Level | Retransmission Rate (Lower Range) | Retransmission Rate (Upper Range) |
|---|---|---|
| 0 | 0% | 10% |
| 1 | 10% | 20% |
| 2 | 20% | 30% |
| 3 | 30% | 40% |
| 4 | 40% | 50% |
| 5 | 50% | 60% |
| 6 | 60% | 70% |
| 7 | 70% | — |

In a preferred embodiment, the hub broadcasts the current congestion level value to all communication terminals via a broadcast message. Each communication terminal has a table which matches the current congestion level value to one or more random Aloha data transmission parameters. By use of this table, the network matches one or more random Aloha data transmission parameters to the current network congestion level.

FIG. 4 shows a preferred embodiment of an exemplary Flex Slotted Aloha Congestion table, wherein all numerical values are exemplary in nature. The table contains a plurality of table entries 410 and parameter fields 420. In the embodiment of FIG. 4, the Flex Slotted Aloha Congestion table contains a Congestion Level field 422, a Randomization Interval field 424, and a Maximum Random Transmission Length field 426. Each table entry 410 has a congestion level value 432 in the Congestion Level field 422, a randomization interval 434 in the Randomization Interval field 424, and a maximum random transmission length 436 in the Maximum Random Transmission Length field 426.

In a preferred embodiment, each communication terminal selects a predetermined maximum allowable random Aloha data transmission length based upon the current congestion level value which it receives from the hub. As described above, when a communication terminal has a data transmission for random Aloha mode, it selects a time slice in a time slice gap 350, between reserved time slots, for random Aloha data transmission. If the length of the data transmission is too long for the time slice gap, OR if the length of the data transmission is longer than the maximum allowed random Aloha transmission size, then the communication terminal only transmits a reservation request 360. Otherwise, the full data transmission is transmitted.

With several different congestion level values defined with a suitable matched set of maximum allowable random Aloha data transmission length parameters, Flex Slotted Aloha operates similarly to unslotted Aloha when the traffic load is light. When the traffic load increases, the increasing congestion level results in shorter and shorter gaps between reserved slots. As the gap sizes decrease, a smaller and smaller percentage of random transmissions will fit into the gaps and be transmitted in random Aloha mode. The transmissions that do not fit into these gaps will be shifted to reservation mode. This effect selectively applies more to longer transmissions than to shorter transmissions. Also, the increasing congestion level value reduces the maximum length of transmissions allowed to be transmitted in random Aloha mode. These two effects shift increasing portions of traffic to reservation mode.

As a result of its unique features, a flex slotted Aloha protocol according to the present invention produces improved throughput efficiency compared with prior art protocols when network traffic contains packets of varying lengths. Consider the following simplified example: a network having a 50/50 mixture of two different packet lengths—"Long" and "Short" wherein the minimum packet (slice) size is 32 bytes and the average packet size is 384 bytes/packet. In the example, we assume a channel data rate of 128 kbps and a random Aloha transmission load of 50%. Tables 2, 3 and 4 below compare the calculated performance of a flex slotted Aloha protocol according to the present invention, with the calculated performance of prior art conventional and "fixed frame" slotted Aloha protocols.

Table 2 shows the throughput of a conventional slotted Aloha protocol for various slot sizes when the network traffic has packets of varying lengths. For each row, the traffic consists of an equal mixture of "Short" packets and "Long" packets of the indicated lengths. The columns correspond to various sized slots. As can be seen, the throughput varies from 5.95 to 12.64 packets/sec. With an average packet size of 384 bytes, the throughput efficiency therefore is between 14.3% and 30.3%—close to the theoretical maximum. Maximum throughput is achieved when all of the slots are perfectly matched to the packet sizes.

TABLE 2

Channel Throughput Packets/Second for Various Slot Sizes

| Bytes/Packet Short | Long | 256 Bytes/ Slot | 288 Bytes/ Slot | 320 Bytes/ Slot | 352 Bytes/ Slot | 384 Bytes/ Slot | 416 Bytes/ Slot | 448 Bytes/ Slot | 480 Bytes/ Slot | 512 Bytes/ Slot | 544 Bytes/ Slot |
|---|---|---|---|---|---|---|---|---|---|---|---|
| 384 | 384 | 9.48 | 8.42 | 7.58 | 6.89 | 12.64 | 11.66 | 10.83 | 10.11 | 9.48 | 8.92 |
| 352 | 416 | 9.48 | 8.42 | 7.58 | 9.19 | 8.42 | 11.66 | 10.83 | 10.11 | 9.48 | 8.92 |
| 320 | 448 | 9.48 | 8.42 | 10.11 | 9.19 | 8.42 | 7.78 | 10.83 | 10.11 | 9.48 | 8.92 |
| 288 | 480 | 9.48 | 11.23 | 10.11 | 9.19 | 8.42 | 7.78 | 7.22 | 10.11 | 9.48 | 8.92 |
| 256 | 512 | 12.64 | 11.23 | 10.11 | 9.19 | 8.42 | 7.78 | 7.22 | 6.74 | 9.48 | 8.92 |
| 224 | 544 | 9.48 | 11.23 | 10.11 | 9.19 | 8.42 | 7.78 | 7.22 | 6.74 | 6.32 | 8.92 |
| 192 | 576 | 9.48 | 11.23 | 10.11 | 9.19 | 8.42 | 7.78 | 7.22 | 6.74 | 6.32 | 5.95 |
| 160 | 608 | 9.48 | 8.42 | 10.11 | 9.19 | 8.42 | 7.78 | 7.22 | 6.74 | 6.32 | 5.95 |
| 128 | 640 | 9.48 | 8.42 | 10.11 | 9.19 | 8.42 | 7.78 | 7.22 | 6.74 | 6.32 | 5.95 |
| 96 | 672 | 9.48 | 8.42 | 7.58 | 9.19 | 8.42 | 7.78 | 7.22 | 6.74 | 6.32 | 5.95 |
| 64 | 704 | 9.48 | 8.42 | 7.58 | 9.19 | 8.42 | 7.78 | 7.22 | 6.74 | 6.32 | 5.95 |
| 32 | 736 | 9.48 | 8.42 | 7.58 | 6.89 | 8.42 | 7.78 | 7.22 | 6.74 | 6.32 | 5.95 |

Table 3 shows the throughput of a prior art "fixed frame" slotted Aloha protocol when the network traffic has packets of varying lengths. A fixed frame slotted Aloha system divides time into a series of equal-length time frames. In the present example, the time frames are each 768 bytes (24 slices) in duration.

Each time frame is divided into two type of time slots: reservation request slots and reserved slots. The reservation request slots are each one slice in duration and transmission within these slots is via conventional slotted Aloha. Each reserved slot is assigned to a specific communication terminal based on a successful reservation request. In the present example, the reservation request transmission load is limited to an average of no more than 50% of the reservation request slots. The transmission load for the reserved slots is limited to a long-term average of no more than 80%.

In a fixed frame slotted Aloha system, a "frame configuration" is assigned which remains unchanged for long periods of time. In the present example, the frame is set to accommodate two average packet lengths, or 768 bytes/frame. For each row, the traffic consists of an equal number of "Short" packets and "Long" packets of the indicated lengths. As can be seen, the throughput varies from 11.11 to 16.67 packets/sec. With an average packet size of 384 bytes, the throughput efficiency therefore is between 26.7% and 40%.

TABLE 3

| Bytes/Packet | | Channel Throughput |
|---|---|---|
| Short | Long | Packets/Second |
| 384 | 384 | 16.67 |
| 352 | 416 | 16.67 |
| 320 | 448 | 16.67 |
| 288 | 480 | 16.67 |
| 256 | 512 | 16.67 |
| 224 | 544 | 16.67 |
| 192 | 576 | 16.67 |
| 160 | 608 | 16.67 |
| 128 | 640 | 16.67 |
| 96 | 672 | 16.67 |
| 64 | 704 | 11.11 |
| 32 | 736 | 11.11 |

Table 4 shows the throughput of a flex slotted Aloha protocol according to the present invention when the network traffic has packets of varying lengths. For each row, the traffic consists of an equal number of "Short" packets and "Long" packets of the indicated lengths. As can be seen, the throughput remains constant at 31.71 packets/sec. With an average packet size of 384 bytes, the throughput efficiency therefore is approximately 76%.

TABLE 4

| Bytes/Packet | | Channel Throughput |
|---|---|---|
| Short | Long | Packets/Second |
| 384 | 384 | 31.71 |
| 352 | 416 | 31.71 |
| 320 | 448 | 31.71 |
| 288 | 480 | 31.71 |
| 256 | 512 | 31.71 |
| 224 | 544 | 31.71 |
| 192 | 576 | 31.71 |
| 160 | 608 | 31.71 |
| 128 | 640 | 31.71 |
| 96 | 672 | 31.71 |
| 64 | 704 | 31.71 |
| 32 | 736 | 31.71 |

In a preferred embodiment, a communication network operates with a plurality of Flex Slotted Aloha channels. In that case, in a preferred embodiment, the communication network includes automatic dynamic load balancing. As long as all reservation requests (explicit and implicit) on a given channel can be satisfied without a queuing delay beyond a configurable queuing delay limit, every Flex Slotted Aloha communication terminal remains on the same channel.

However, when reservations queue beyond the delay limit for one channel, while reservation requests do not queue beyond the delay limit for a second channel, then the network hub reassigns communication terminals from the first channel to the second channel. In a preferred embodiment, the network hub selects for reassignment communication terminals on the first channel with unallocated outstanding reservation requests. In a preferred embodiment the reassigned communication terminals each have a queuing delay which is greater than said queuing delay limit.

In a preferred embodiment, the network hub broadcasts a message instructing the reassigned communication terminals to move to the second channel. The communication terminals that are moved to the second channel remain indefinitely on the newly assigned second channel. Dynamic reassignment in this way decreases the average reservation queuing delay along with shifting transmissions from heavily loaded channels to lightly loaded channels.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. In a burst-type point-to-multipoint communication network comprising a network hub and a plurality of communication terminals, a method of communicating comprising:
   determining a network congestion level value for data transmissions in a shared communication channel;
   broadcasting the network congestion level value to the plurality of communication terminals;
   receiving the network congestion level value at a one of said plurality of communication terminals; and
   adjusting a maximum random data transmission length at said one communication terminal to match a preselected maximum random datatransmission len level value.

2. The method of claim 1, further comprising adjusting a randomization interval at said one communication terminal to match a pre-selected randomization interval corresponding to said network congestion level value.

3. The method of claim 1, wherein said determining a network congestion level value for data transmissions comprises measuring a retransmission data rate.

4. In a communication network comprising a network hub, a plurality of communication terminals and a plurality of communication channels, a method of assigning communication terminals to the plurality of communication channels, comprising:
   measuring, at the network hub, a first queuing delay for a first group of said plurality of communication terminals communicating on a first communication channel, said first queuing delay being greater than a predetermined delay limit;
   measuring, at the network hub, a second queuing delay for a second group of said plurality of communication terminals communicating on the second communication channel, said second queuing delay being less than said predetermined delay limit; and
   assigning a subset of said first group of communication terminals to communicate thereafter on the second communication channel.

5. The method of claim 4, wherein said subset of said first group of communication terminals comprises communication terminals having outstanding reservation requests on said first communication channel.

6. The method of claim 5, wherein said subset of said outstanding reservation requests for said subset of said first group of communication terminals each have a queuing delay which is greater than said queuing delay limit.

* * * * *